United States Patent [19]
Meier

[11] 3,717,935
[45] Feb. 27, 1973

[54] INCLINOMETER OR OSCILLATION MEASURING DEVICE

[76] Inventor: Johann Meier, 6645 Brione sopra Minusio, Casa Clarissa, Switzerland

[22] Filed: Oct. 12, 1970

[21] Appl. No.: 80,051

[30] Foreign Application Priority Data

Oct. 15, 1969 Switzerland..................15531/69

[52] U.S. Cl. ............................................. 33/391
[51] Int. Cl. ............................................. G01c 9/12
[58] Field of Search ....................... 33/215 C, 215 A

[56] References Cited

UNITED STATES PATENTS 1,183,638  5/1916  Glaser..............................33/215 C

FOREIGN PATENTS OR APPLICATIONS 629,244   7/1927   France............................33/215 C
51,804    5/1890   Germany..........................33/215 C
70,816    8/1946   Norway...........................33/215 C
124,647   12/1959  U.S.S.R..........................33/215 A

*Primary Examiner*—Robert B. Hull
*Attorney*—Werner W. Kleeman

[57] ABSTRACT

An inclinometer or oscillation measuring device which is manifested by the features that there is provided a pendulum member having an elliptically guiding arrangement consisting of a link hingedly connected with this pendulum member and a rectilinear displacement path for the pivot point of the pendulum member along a line extending through the pivot point of the link at the end remote from the pendulum. Furthermore, the pendulum and link components are dimensioned and/or arranged in such a way that the link is balanced and the pivots so located that the center of gravity of the pendulum member travels along a curve with a continuously upward curvature from its central point.

13 Claims, 6 Drawing Figures

3,717,935

INCLINOMETER OR OSCILLATION MEASURING DEVICE

BACKGROUND OF THE INVENTION

The present invention relates to a new and improved inclinometer or oscillation measuring device.

The prior art pendulum inclinometers possess the drawback that during the measurement of slight inclinations in the range of several minutes the pendulum carries out such a similarly small deflection. Consequently, the readout accuracies are naturally limited, notwithstanding the fact that nowadays it is extremely desirable to have greater measuring accuracy than was heretofore attainable.

In the case of mechanical oscillation or inclination measuring devices, the oscillation period of the pendulum is dependent upon the length of the pendulum, so that pendulums with larger oscillation periods are very cumbersome and heavy devices. The miniaturization of seismographic oscillation measuring devices is important in order to reduce manufacturing costs, and as far as mechanical measuring instruments are concerned, has not attained to any degree the advancements achieved with electronic measuring devices.

SUMMARY OF THE INVENTION

Accordingly, there is a real need in the art for inclinometers or oscillation measuring devices of the mentioned type which are not associated with the aforementioned drawbacks. Therefore, a primary objective of the present invention is to provide just such an improved inclinometer which capably fulfills this need.

Still a further significant object of the present invention relates to an improved inclinometer of oscillation measuring device in which, during the measurement of an angle of inclination, the deflection of the pendulum amounts to a multiple of the length of the pendulum, thereby rendering possible increased read-out accuracy.

Still a further significant object of the present invention relates to an improved inclinometer wherein for the same oscillation period as for a standard physical pendulum there is required a considerably smaller pendulum structure.

Now, in order to implement these and still further objects of the invention, which will become more readily apparent as the description proceeds, the inventive inclinometer or oscillation measuring device has the pendulum system in the form of an elliptically guiding arrangement consisting of a pendulum member and a link hingedly connected with the pendulum member. The pivot point of the pendulum member is slidable along a straight vertical line extending through a fixed pivot point of one end of the link whose other end is pivoted to the pendulum. Furthermore, the components of the pendulum system are dimensioned and/or constructed in such a way that the center of gravity of the pendulum system moves along a curve expressed by the function $y(x)$, wherein $y''(x) > 0$, i.e., the path curves continuously upward from the equilibrium point, for the pivot or oscillation range of the pendulum member, and the ordinate or Y-axis of the coordinate system associated with this curve extends along or at least parallel to the aforementioned straight line passing through the pivot point of the pendulum member.

It is advantageous if the spacing between the pivot point of the pendulum member and the hinge connection between the pendulum member and the link is in the same order of magnitude as or equal to the length of the link and in the case of a suspended pendulum the spacing between the center of gravity of the pendulum member located beneath the above-mentioned hinge connection and the hinge connection itself is greater than the effective length of the link, and in the case of an upright or standing pendulum the spacing between the center of gravity of the pendulum member located above the above-mentioned hinge connection and the hinge connection itself is smaller than the effective length of the link.

Furthermore, the invention advantageously contemplates constructing the link in such a manner that its center of gravity or mass coincides with the fixed pivot point.

Additionally, in order to obtain a displaceable mounting of the pendulum pivot point which is as free of friction forces as possible, it is advantageous to provide the pendulum member at its pivot point with at least one roller bearing, the axis of rotation of which extends perpendicular to the plane of oscillation or pivoting of the pendulum member. Furthermore, such roller bearing is guided in a linear guide parallel to the displacement direction of the pendulum pivot point. This linear guide arrangement is formed by two preferably rotable cylindrical body members, for instance bearing rollers, the lengthwise axes of which extend parallel to the displacement direction of the pendulum pivot point, so that between the aforesaid roller bearing and the cylindrical-shaped bodies only a line contact is present.

Furthermore, it is advantageous to provide the link with indicator means for indicating the inclination of the instrument and the deflection of the pendulum, respectively.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
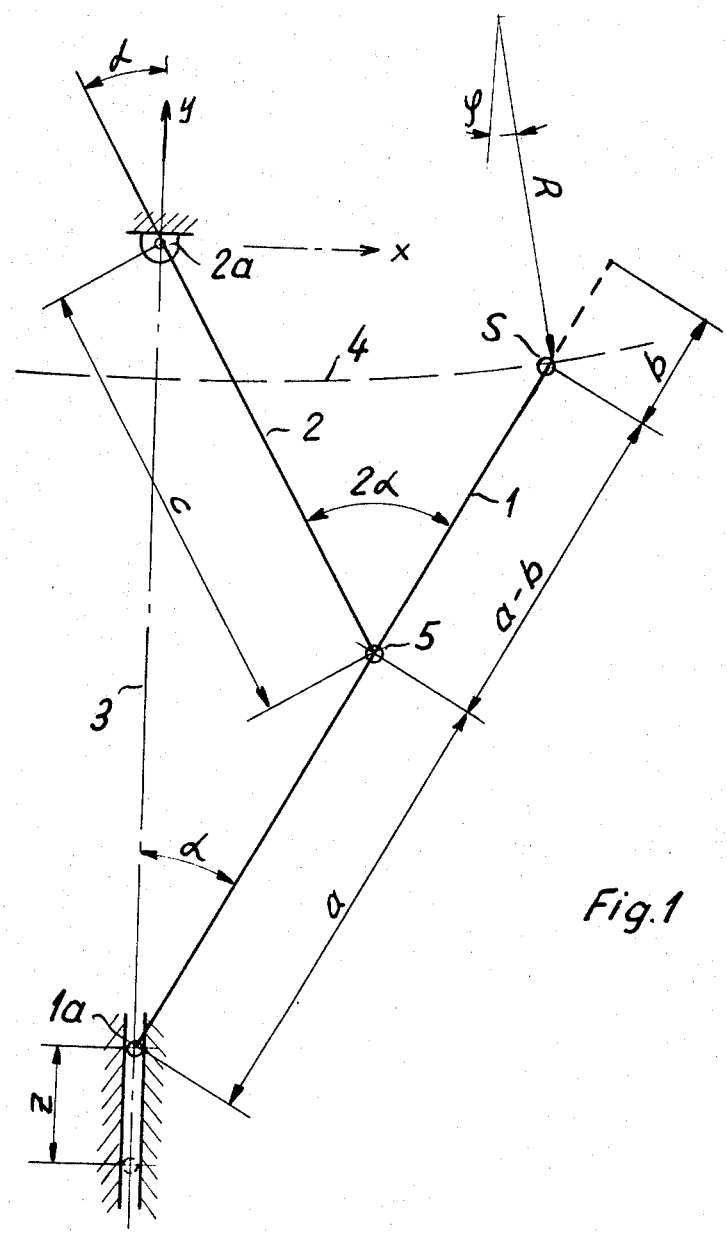
FIG. 1 schematically illustrates the construction of a pendulum system for a so-called upright or standing pendulum designed according to the teachings of the present invention.

Describing now the drawings, FIG. 1 schematically illustrates the principles utilized for the construction of a pendulum system having a standing or upright pendulum 1. As may be readily seen by reference to the illustration of FIG. 1, the pendulum system is constructed in the manner of an elliptically guided arrangement and embodies the pendulum or pendulum member 1 and a link 2 pivotably connected at location 5 with such pendulum 1. The pivot point 1a of the pendulum 1 is arranged to be displaceable along a straight line 3 extending through the pivot point 2a of the link 2, pivot point 2a being located at the end of the link 2 remote from the pendulum member 1. Furthermore, the invention contemplates that the components 1 and 2 of the pendulum system be dimensioned and/or arranged in such a fashion that the mass or center of gravity s of the pendulum system, which in the illustrated schematic diagram is located at the end of the pendulum 1 as shown, travels along a curve 4 since the link 2 is constructed such that its mass or center of gravity coincides with the pivot point 2a of such link 2 so that the link 2 does not exert any directing moment or couple upon the pendulum 1. The curve 4 may be expressed by the function $y(x)$ wherein there prevails the relationship $y''(x>0$ over the pivot or oscillation range of the pendulum 1, as will be more fully demonstrated shortly. Furthermore, the pendulum 1 always returns back into its rest or dead-center position coinciding with the straight line 3. The ordinate or Y-axis of the coordinate system associated with this curve 4 extends along or at least parallel to the straight line 3 extending through the pendulum member pivot point 1a and the link pivot point 2a. Point 2 is here taken as the origin of $x$ and $y$.

The spacing $a$ between pendulum pivot point 1a and the articulated or hinge connection 5 between the pendulum member 1 and the link 2 is equal to the length $c$ of the link 2. And the spacing between the center of gravity $s$ of the pendulum member 1 located above the hinge connection 5 and the hinge connection 5 itself is smaller than the length $c$ of the link 2.

Now, in order to calculate the curve 4, the following are applicable:

$$\sin\alpha = (x/2a-b);\ \cos\alpha = -(y/b)$$

In consideration of the relationship:

$$\sin^2\alpha + \cos^2\alpha = 1$$

the following equation defines the curve 4:

$$y = -b \cdot \sqrt{1 - \left(\frac{x}{2a-b}\right)^2}$$

The radius of curvature (theoretical pendulum length) R is function of y:

$$R = \frac{\left[1 + \left(\frac{dy}{dx}\right)^2\right]^{3/2}}{\frac{d^2y}{dx^2}}$$

$$\frac{d^2y}{dx^2} = y'' = \left(\frac{b}{2a-b}\right)^2 \cdot \frac{1}{|y|} \left[1 + \left(\frac{b}{2a-b}\right)^2 \cdot \frac{x^2}{y^2}\right]$$

With
$x = (2a-b)\sin\alpha$
$y = -b \cdot \cos\alpha$ then,
$y = (b/2a-b) \cdot \tan\alpha$
for R there results the function:

$$R = [1 + (b/2a-b \cdot \tan\alpha)^2]^{3/2} \cdot (2a-b)^2/b \cdot \cos^3\alpha$$

In the dead center position where $\alpha = 0$ there is applicable the relationship $$R_0 = (2a-b)^2/b$$

The slope m of the curve and the inclination of the support surface can be derived from $y'$.

$$\text{Slope } m = \tan\phi = (b/2a-b) \cdot \tan\alpha$$

The pendulum transformation ratio N is therefore:

$$N = (\alpha/\phi) \approx (2a-b/b)$$

Numerical Example:
Selection for the values:
$a = 50.5$ mm
$b = 1.0$ mm
measuring range $\phi_E = \pm 6$ feet $= \pm 360$ inches
Consequently, there occurs a pendulum transformation ratio (multiplication factor) N of 100.
The angle of inclination of the pendulum or pendulum member and the link is $$\tan\alpha_E = (2a-b/b) \cdot \tan\phi_E$$

$$\alpha_E \approx \pm 10°$$

Figure 6:
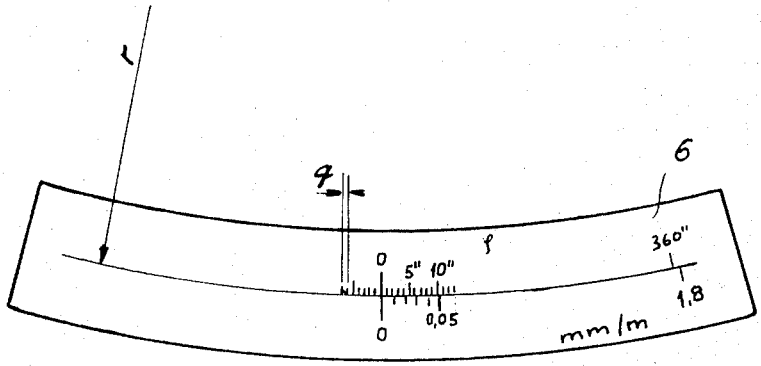
FIG. 6 is a plan view of the graduated plate of the inclination measuring instrument or inclinometer illustrated in FIGS. 3 and 4.

If there is provided on the link the attached graduated plate 6 (FIG. 6) with a radius of 103 mm, then, the size of the second divisions is $50\mu$.

The graduated plate 6 must be tangent-corrected since otherwise with an (average) linear graduation or sub-division the maximum error $\Delta\phi = 1.6$ inches, that is, would be too large.

Over the range $\phi_E = \pm 6$ feet $= 360$ inches the difference between the inclination angle $\phi$ and the slope or inclination $m = \tan\phi$:

$$\phi_E = 6 \text{ feet} = 360 \text{ inches} = 360 \cdot 0.4848 \cdot 10^{-5} \text{ radians} = 0.0017453 \text{ radians}$$

$$\tan\phi_E = 0.0017453$$

that is, the error $f$ of $\phi_E = \tan\phi_E$ is smaller than one-fiftieth sec.

If there is used for the read-out of the graduated plate 6 a micrometer with a 20th division, then it is possible to read out, $$\phi_A = \pm 0.05 \text{ inch, or}$$

$$m = \pm 0.5\ \mu/m$$

Figure 2:
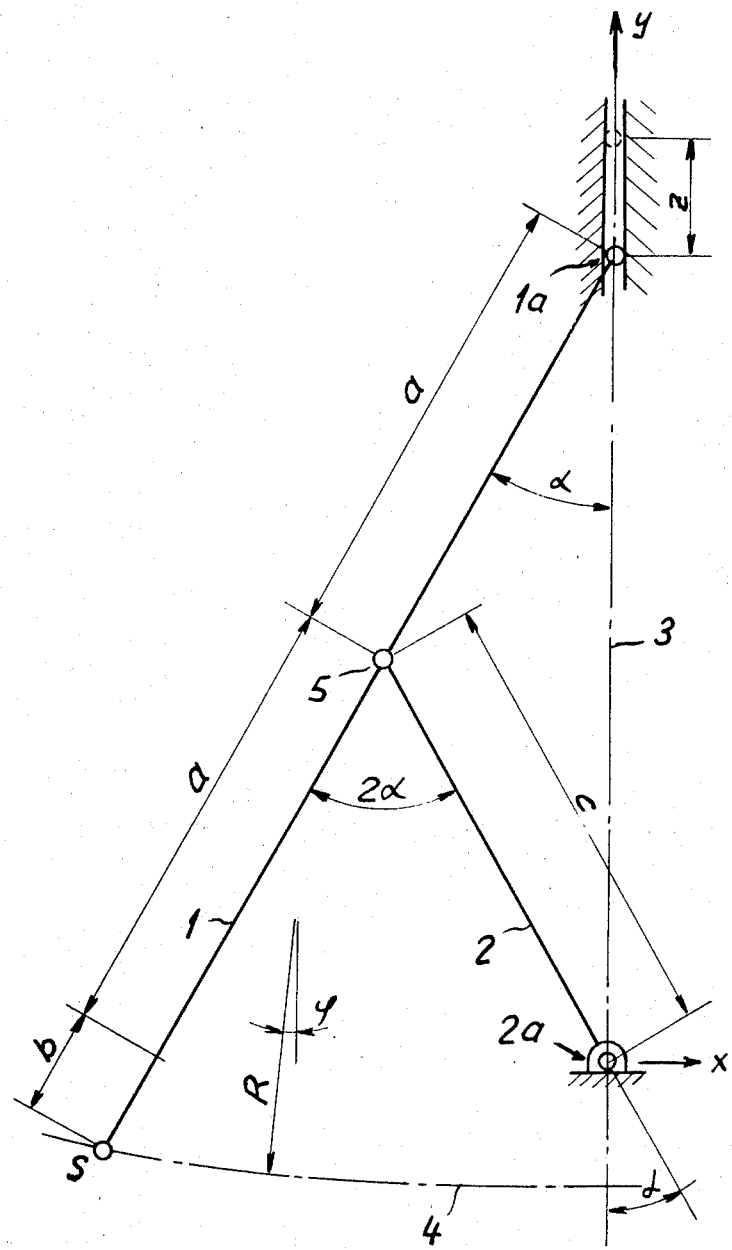
FIG. 2 schematically illustrates the construction of a pendulum system for a suspended pendulum designed according to the teachings of the present invention.

In FIG. 2 there is schematically illustrated the construction of the pendulum system with a so-called suspended or hanging pendulum.

The components which are identical or analogous to those shown in the system of FIG. 1 have been designated with the same reference numerals or characters.

For the curve 4 the following equation holds true:

$$y = -b \cdot \sqrt{1-\left(\frac{x}{2a-b}\right)^2}$$

For the radius of curvature R the following equation exists:

$$R = \frac{\{(2a+b)^4 - [(2a+b)^2 - b^2] \cdot x^2\}^{3/2}}{b \cdot (2a+b)^4}$$

In the rest or dead-center position $x = 0$ and from such it follows:

$$R_0 = (2a+b)^2/b$$

With $a = 59.5$ mm and $b = 1.0$ mm. then $$R_0 = 14.4 \text{ m}$$

Angle multiplication:

$$\tan \phi = (b/2a+b) \cdot \tan \phi$$

With
$$\alpha_{max} = \pm 30°$$
then
$$\phi_{max} = \pm 16 \text{ feet } 34.175 \text{ inches}$$
or
$$m_{max} = \pm 4.81125 \text{ mm/m}$$
and the amplitude of pivot travel is:
$$Z_{max} = 8 \text{mm}$$

Figure 3:
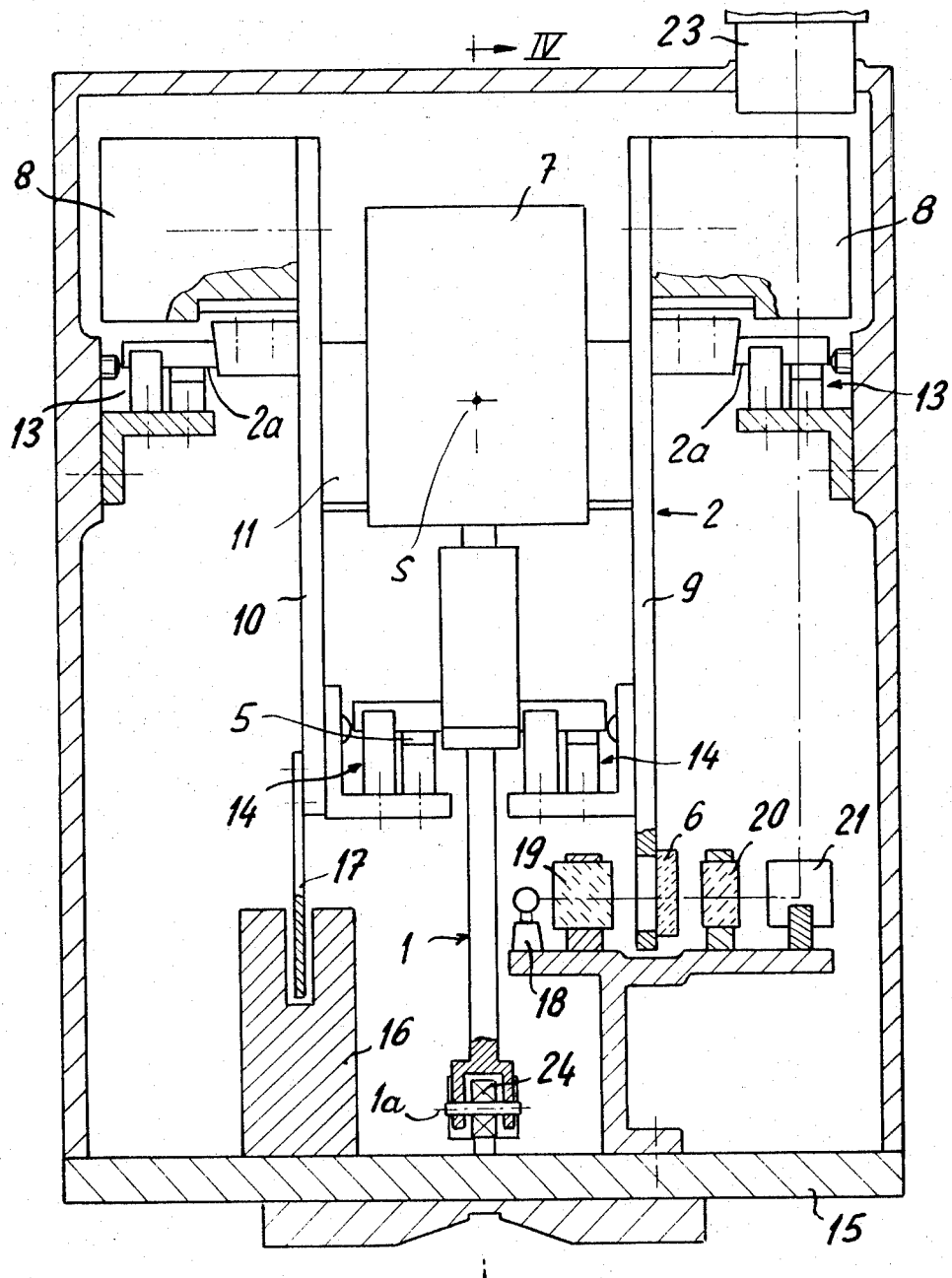
FIG. 3 is a cross-sectional view of a first exemplary embodiment of inventive inclination measuring device or inclinometer having a standing pendulum, and taken substantially along the line III—III of FIG. 4.
Figure 4:
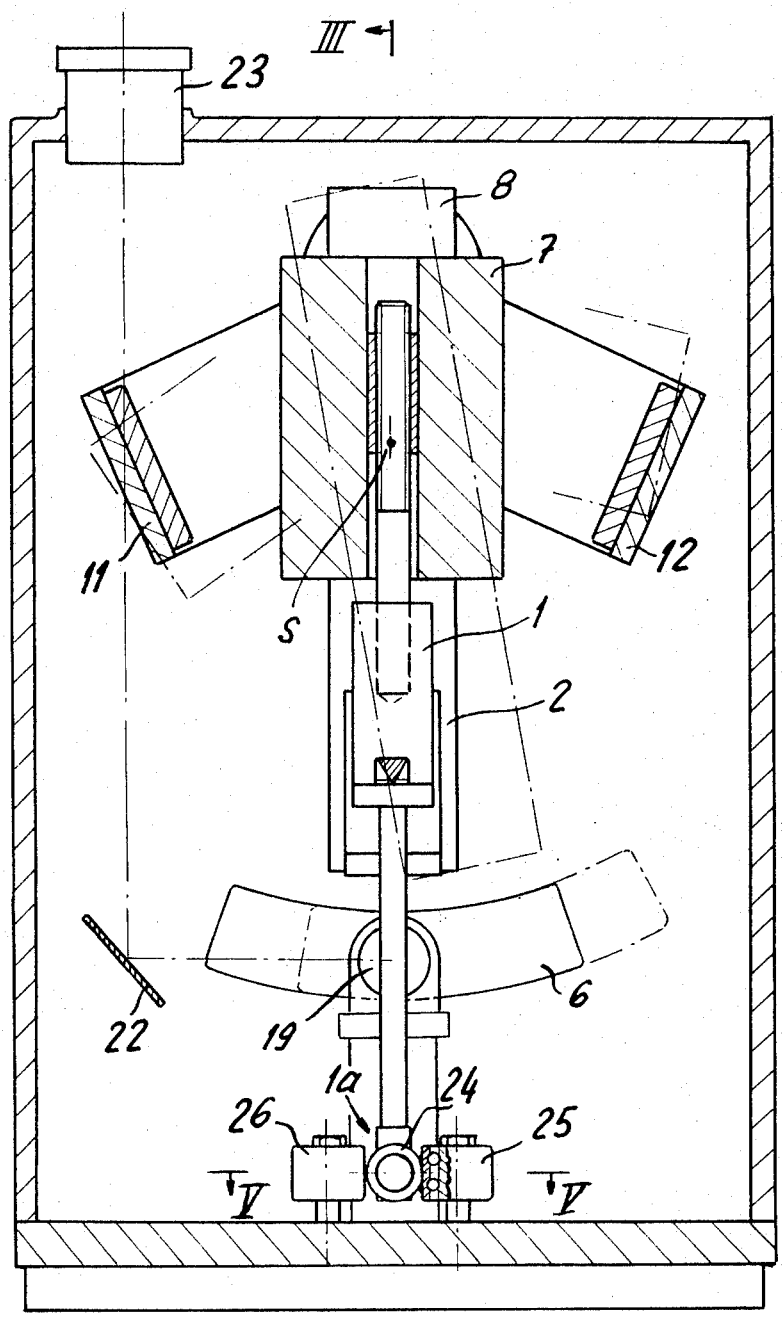
FIG. 4 is a cross-sectional view of the inclinometer shown in FIG. 3, taken substantially along the line IV—IV thereof.

In FIGS. 3 and 4 there is illustrated an exemplary embodiment of inventive inclination measuring device, possessing the following technical data:

| | |
|---|---|
| pendulum leg length | $a = 80.5$ mm |
| distance of the pendulum center of gravity 5 from the hinge 5 in excess of the pivot point distance c | $b = 1.0$ mm |
| measuring range | $\phi_R = \pm 10'$ |
| theoretical oscillation period (kinematic) | $T_0 = 9.45$ sec. |
| average radius of curvature | $R_m = 22.1$ m |

On account of the moment of inertia of the pendulum leg, the oscillation period amounts to $T = 15$ sec.

Continuing, it will be understood that the pendulum member or pendulum 1 is provided at its upper end with a primary mass 7 arranged and designed in such a manner that the spacing of the center of gravity s of the pendulum 1 from the pendulum pivot 1a amounts to 160 mm.

In order to prevent the link 2 from possessing its own directing moment or couple, such is equipped with two counterweights 8 which are arranged and measured or designed such that the center of gravity of the link 2 is located at the link pivot point 2a.

The link 2 consists of two side supports 9 and 10, rigidly connected with one another by means of the connection brackets 11 and 12. In order to maintain the bearing hysteresis as small as possible, knife edge-bearings 13 and 14 with an end ball bearing are employed at the link-pivot point 2a and at the hinge connection 5, respectively.

Furthermore, a magnet 16 is arranged at the base 15 of the housing of the instrument for the purpose of dampening the oscillatory movements of the link 2, this magnet 16 cooperating with a sheet metal plate 17 secured to the lower end of the side support 10. At the lower end of the second side support 9 there is arranged a graduated plate 6 which, for instance, can be read out through the intermediary of an optical read-out system. The optical read-out system consists of a lamp 18, a condenser 19, objective 20, both mirrors 21 and 22, and an ocular 23.

In order to determine the inclination of the pendulum 1 it is also possible, instead of using the optical read-out system, to connect with the link 2 a conventional grid arrangement which cooperates with a second grid arrangement fixedly connected to the instrument in such a manner that the inclination or deflection of the pendulum 1 can be determined photoelectrically.

Due to the use of knife edge-bearings 13 and 14 at the hinge connection 5, the pendulum member exhibits a slight lateral play, perpendicular to the pendulum plane. In order that the knife edge-bearings 13 and 14 can freely play without obstruction, it is advantageous if the pendulum 1 is also slightly laterally displaceable in its longitudinal guide at 1a.

Figure 5:
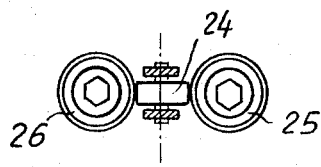
FIG. 5 is a sectional view of a detail of the inclinometer of FIGS. 3 and 4, taken substantially along the line V—V thereof.

As will be observed by referring to FIGS. 3, 4 and 5, the pendulum member or pendulum 1 is provided at its pivot point 1a with a roller bearing 24, the axis of rotation of which is perpendicular to the pivot or oscillation plane of such pendulum 1, this roller bearing 24 being guided in a linear guide arrangement 25, 26 substantially parallel to the displacement direction 3 of the pendulum pivot point 1a. In order to oppose with as small as possible resistance lateral displacement of the lower end of the pendulum 1, perpendicular to its oscillation or pivot plane, the linear guide arrangement 25, 26 advantageously consists of two roller bearings 25 and 26, the axes of rotation of which extend parallel to the displacement direction of the pendulum pivot point 1a. As a result, there is formed an exact, robust and nonetheless simple linear guide arrangement which satisfies the requirements placed upon such precision instruments.

While there are shown and described present preferred embodiments of the invention, it is to be distinctly understood that the invention is not limited thereto, but may be otherwise variously embodied and practiced within the scope of the following claims. Accordingly,

What is claimed is:

1. An inclinometer or oscillation measuring device comprising a pendulum system embodying a pendulum member, a link hingedly connected with said pendulum member, means providing a pivot on said pendulum member, a housing providing a fixed pivot point for said link located at one end of said link remote from said pendulum member, means on said housing for guiding said pivot on said pendulum member along for displacement a substantially straight line extending through said fixed pivot point, said pendulum system being dimensioned and arranged in such a manner that the center of gravity of said pendulum system travels along a path continuously upward curving from the equilibrium point.

2. The device as defined in claim 1, wherein said link is designed such that its center of gravity coincides with its fixed pivot point.

3. The device as defined in claim 1, wherein the spacing between said pivot point for said pendulum member and said location of said hinge connection between said link and said pendulum member is equal to the length of said link, and further wherein said pivot point for said pendulum member and said pivot point for said link are arranged such as to provide a suspended pendulum member wherein the spacing between the center of gravity of said pendulum system and said hinge connection is greater than the length of said link.

4. The device as defined in claim 3, wherein said link possesses a length in the range of 60 to 120 mm, and the spacing between the pivot point of said pendulum member and the center of gravity of said pendulum member amounts to twice the length of said link plus a value lying in the range of about 0.5 to 3.0 mm.

5. The device as defined in claim 1, wherein the spacing between said pivot point of said pendulum member and said hinge connection between said pendulum member and said link is equal to the length of said link, and further wherein the pivot point of said pendulum member and the fixed pivot point of said link are arranged such that there is provided an upstanding pendulum member, with the spacing between the center of gravity of said pendulum system and the hinge connection being smaller than the length of said link.

6. The device as defined in claim 5, wherein said link possesses a length in the range of 60 to 120 mm., and the spacing between the pivot point of said pendulum member and the center of gravity of said pendulum member amounts to twice the length of said link minus a value lying in the range of about 0.5 to 3 mm.

7. The device as defined in claim 1, further including indicating means provided for said link, said indicating means indicating the deflection of said pendulum member.

8. The device as defined in claim 7, wherein said indicating means comprises a graduated plate member operatively connected with said link.

9. The device as defined in claim 7, wherein said indicating means comprises a first grid arrangement coupled with said link and a second grid arrangement fixedly coupled with said device, said first grid arrangement cooperating with said second grid arrangement in order to be able to photoelectrically ascertain the deflection of said pendulum member.

10. The device as defined in claim 1, wherein the fixed pivot point for said link and said hinge connection between said pendulum member and said link are defined by knife-edge bearing means.

11. The device as defined in claim 10, wherein said means comprising said pivot point for said pendulum member embodies at least one roller bearing means possessing an axis of rotation extending substantially perpendicular to the plane of pivotal movement of said pendulum member, and linear guide means for guiding said roller bearing means substantially parallel to the direction of displacement of said pivot point of said pendulum member.

12. The device as defined in claim 11, wherein said linear guide means embodies a pair of rotatably mounted substantially cylindrical body members, the lengthwise axes of which extend substantially parallel to the direction of displacement of the pivot point of said pendulum member, so that only a line contact occurs between said roller bearing means and said cylindrical body members.

13. The device as defined in claim 12, wherein said cylindrical body members are defined by bearing roller means permitting displacement of said pivot point of said pendulum member perpendicular to the plane of pivotal movement of said pendulum member.

* * * * *